United States Patent [19]

Larson

[11] 4,240,859
[45] Dec. 23, 1980

[54] METHOD OF MAKING A WATER BED MATTRESS

[76] Inventor: Lynn D. Larson, 6501 Park Crest, Lincoln, Nebr. 68506

[21] Appl. No.: 38,375

[22] Filed: May 11, 1979

[51] Int. Cl.³ .............................................. B29C 17/04
[52] U.S. Cl. ......................................... 156/245; 5/451; 156/285; 264/553; 264/571
[58] Field of Search ............... 156/145, 242, 245, 285; 5/441, 449, 450, 451, 452, 455; 264/512, 544, 545, 553, 554, 571, 46.8

[56] References Cited

U.S. PATENT DOCUMENTS

| | | | |
|---|---|---|---|
| 3,753,823 | 8/1973 | Kuss | 156/145 |
| 3,849,814 | 11/1974 | Russ | 5/451 |
| 4,077,074 | 3/1978 | Fogel | 5/451 |
| 4,100,634 | 7/1978 | Benjamin | 5/451 |
| 4,114,213 | 9/1978 | Beernaerts | 264/46.8 |

Primary Examiner—Caleb Weston
Attorney, Agent, or Firm—William D. West

[57] ABSTRACT

A vacuum formed water bed mattress providing a pair of large flat opposite parallel sides and four narrower sides joined to form a substantially right regular parallelopiped is disclosed. One of the large flat sides is made of a heat resistant material. The other flat side and four narrower sides are formed from a single sheet of material by a vacuum and temperature molding process. The two sheets are heat sealed to form the mattress. A method for the making of a water bed mattress is also disclosed.

5 Claims, 6 Drawing Figures

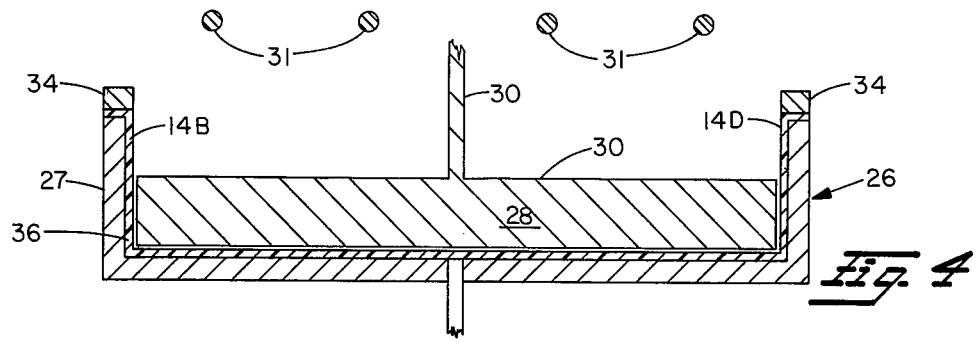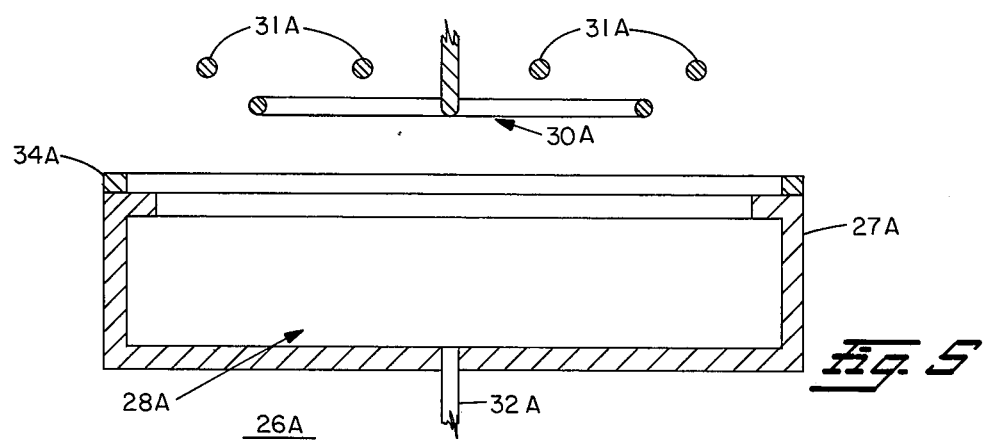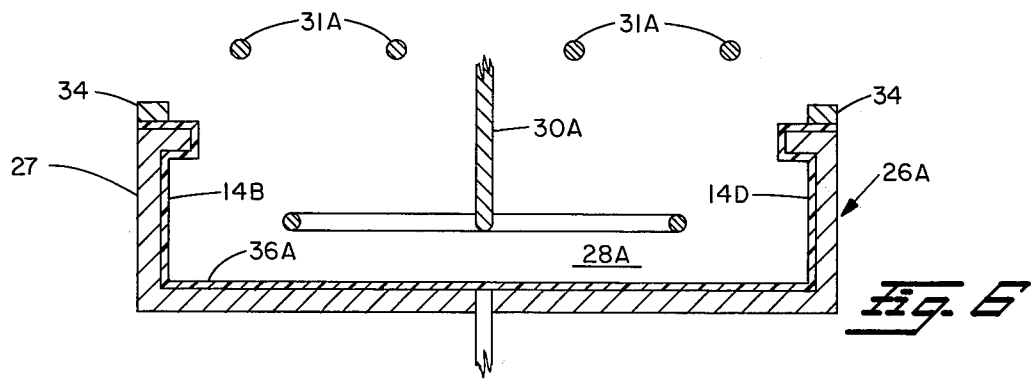

METHOD OF MAKING A WATER BED MATTRESS

BACKGROUND OF THE INVENTION

This invention relates to water beds.

Water bed mattresses generally comprise a flexible outer wall of a plastic such as polyvinyl chloride and a valve for the insertion and removal of water from the interior of the mattress. The plastic outer wall is formed from sheets of plastic seamed at appropriate locations to form a right regular parallelopiped when full of water.

In one type of prior art of water bed mattresses, the seams are along the side and in another type the seams are along the corners and the bottom. It is known for the bottom to include at least a patch of heat-resistant plastic to shield the water bed cover from the heater.

The prior art water beds have the disadvantages of: (1) lacking durability because the seams frequently weaken and cause leaks; (2) being subject to damage or requiring a heat-resistant additional pad on the bottom because heat from the heater causes the plasticizer to leech from the material on the bottom of the water bed mattress, causing breakage and leaks at that location; and (3) being marred in appearance by the seams which are visible from the sides or from the top of the bed.

SUMMARY OF THE INVENTION

Accordingly, a need exists for a water bed mattress which is durable, heat resistant and having a minimum of seams. The instant invention is directed to that need.

It is therefore an object of the invention to provide a novel water bed mattress.

It is a further object of the invention to provide a water bed mattress with seams only around the bottom edge where they are not flexed.

It is a still further object of the invention to provide a water bed mattress with integrally-formed preformed corners.

It is a still further object of the invention to provide a novel water bed mattress which is exceptionally attractive.

It is a still further object of the invention to provide a novel water bed mattress in which seams are not visible from the sides or the top.

It is a still further object of the invention to provide a water bed mattress which has a heat resistant bottom.

It is a still further object of the invention to provide a method for making a novel water bed mattress which permits easy alignment of a bottom section with a top section.

It is a still further object of the invention to provide a novel water bed mattress and method of making it which presents an attractive appearance and is exceptionally durable.

In accordance with the above and further objects of the invention, the top and side portions of a water bed mattress are vacuum formed, preferably from polyvinyl chloride, with all four corners being vacuum formed and a rim being formed around the top portion of the die connecting the corners (bottom of mattress). A marker is formed in the plastic rim portion at the corners.

To form the corners, male die parts are moved into the female die as a plug assist while the vacuum is pulling the plastic against the die. Each of the male die parts is shaped as right corners and covered with felt or other material selected to avoid sticking to the plastic. The male die parts form the right angle corners at the sides of the mattress at the same time as the vacuum is forming the sides so as to avoid cooling of one portion of the mattress before the others are formed and the consequent thinning of the last formed parts.

To form the bottom of the mattress, the flashing is trimmed, leaving a rim and the formed marker around the bottom. The formed top, sides and rim are removed and a rectangularly-shaped heat resistant plastic is sealed to the rim, with the corners aligned with the markers.

To seal the bottom, a special die is inserted under the rim. The die has a long center portion and orthogonal end portions so that it lies under one side of the rim and under its two adjacent corners. One side of the bottom is then aligned from corner to corner over the rim and heat sealed across the side and its adjacent corners. This process is repeated for the opposite side and the remaining two corners. The remaining two sides of the rim are sealed to the bottom by placing a straight bar die under each side in succession and sealing the edge of the bottom over the side, with the straight die being removed through the valve after the last side is sealed.

As can be understood from the above description, the water bed mattress of this invention and the method of making it have the advantages of: (1) having an attractive appearance without seams visible from the top and sides; (2) being durable and able to withstand flexing in normal usage; (3) being able to withstand heating without becoming brittle and cracking on the bottom; and (4) being relative easy and inexpensive to fabricate.

BRIEF DESCRIPTION OF THE DRAWINGS

The above-noted and the other features of the invention will be better understood from the following detailed description when considered with reference to the accompanying drawings in which:

FIG. 4 is another sectional view of the apparatus of FIG. 3 in another stage of fabrication of the water bed mattress of FIG. 1;

FIG. 5 is a sectional view illustrating another embodiment of apparatus for making a portion of the water bed mattress of FIG. 1; and FIG. 6 is another sectional view of the apparatus of FIG. 5 and another stage of fabrication of the water bed mattress of FIG. 1;

DESCRIPTION OF THE PREFERRED EMBODIMENT

Figure 1:
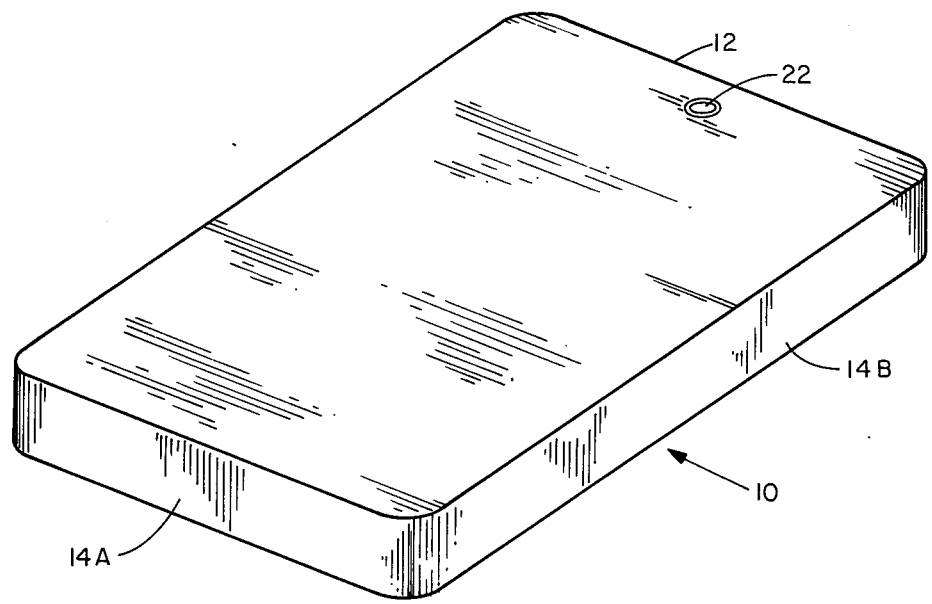
FIG. 1 is a perspective view of a water bed mattress in one position in accordance with an embodiment of the invention.

In FIG. 1 there is shown a water bed mattress 10 having: (1) a top 12 upon which a person rests; (2) sides, two of which 14A and 14B are shown in FIG. 1; and (3) a bottom 16 (shown in FIG. 2). The top side 12 and the side portions are formed integrally with no seams between them, being molded from a single sheet of any plastic material such as polyvinyl chloride so as to withstand stress and provide an attractive appearance. A conventional valve 22 for water and for air release is bonded in a conventional manner to a suitable location on the top surface 12.

Figure 2:
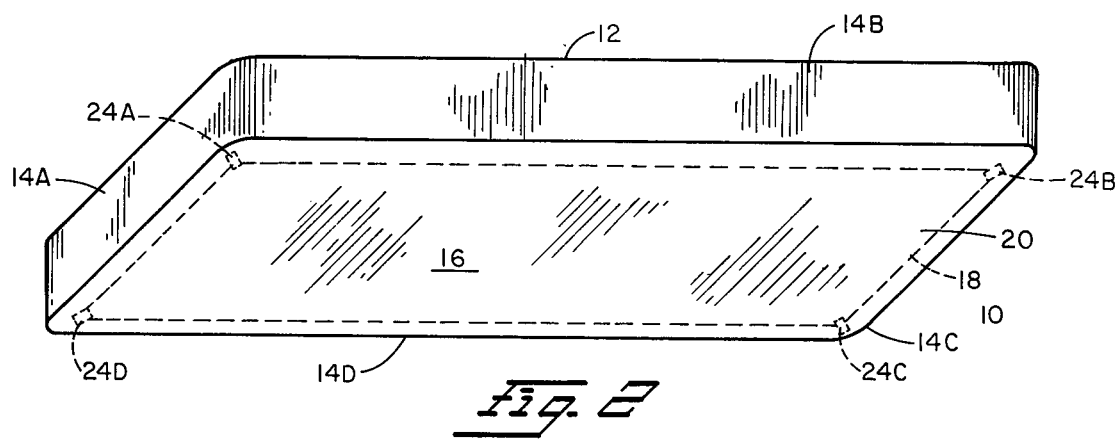
FIG. 2 is a perspective view of the water bed mattress of FIG. 1 from another angle.

In FIG. 2, there is shown the bottom side 16 of the mattress 10 having a rim portion 18 integrally formed with and extending around the four bottom edges of the bottom side 16 of the water bed and overlapped by a bottom sheet 20. The rim 18 is vacuum formed integrally with the top surface 12 and side surfaces (14A and 14B shown) from the same feedstock sheet, which may be polyvinyl chloride (PVC) or another suitable plastic material.

The larger overlapping bottom sheet 20 of the bottom surface 16 is formed of a different material which is heat resistant. This material is less resistant to cracks, pinholes and tears than the polyvinyl chloride used for the other surfaces. However, it has been found that the resistance to cracks, pinholes and tears may be sacrificed in the bottom for increased heat resistance because the bottom side 16 is not flexed to the extent of the other sides and is not put under as much stress. The heat resistance of the material makes it suitable for closer contact with a heater for warming the water within the water bed 10. Also the material used for the top and sides is less expensive than that required for the bottom.

The sheet 20 is heat sealed or solvent sealed over the rim 18, the rim being completely formed with corners during molding of the top and sides of the bed. At each of the corners of the edge 18 is a different one of the formed plastic bubbles 24A-24D which serve as aligning markers for the corners of the bottom surface 20.

The sheet 20 may be made of any heat resistant material but it has been found that polyvinyl chloride (PVC) with a specially blended plasticizer will offer extended life even though a heater is used. The blended plasticizer triisooctyl trimellitate (TIOTM) and the blended plasticizer trioctyl trimellitate (TOTM) have both been found suitable. Both are sold by U.S.S. Chemicals, Division U.S. Steel Corporation, 600 Grant St., Pittsburgh, Pennsylvania 15230. The remainder of the water bed 10 may also be of PVC with any of the following plasticizers: (1) DOP; (2) DOTP; or (3) some similar mixture.

Figure 3:
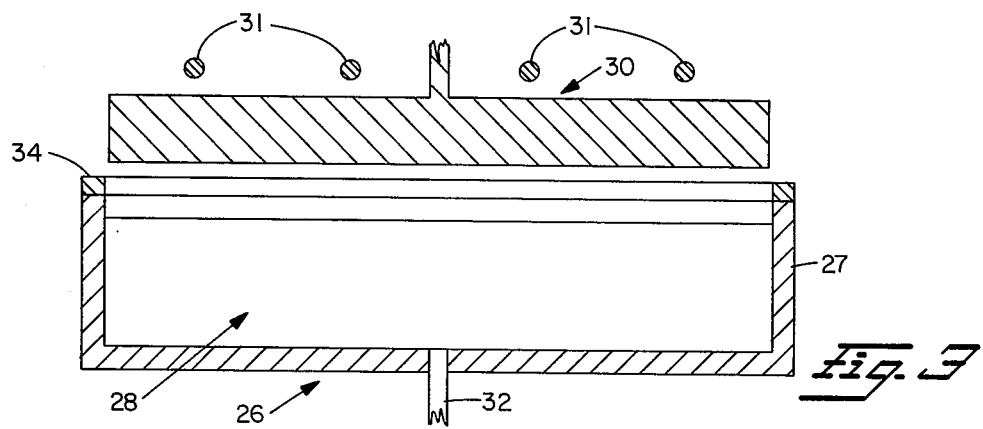
FIG. 3 is a sectional view illustrating apparatus for making a portion of the water bed mattress of FIG. 1.

In FIG. 3 there is shown a schematic sectional view of vacuum molding apparatus 26 having wall portions 27 forming a cavity 28 shaped as the top, sides and a rim around the bottom of the mattress 10 (FIG. 1) and a plug assist 30 which cooperate together with a vacuum outlet 32 to pull and force the PVC plastic sheet downwardly to form the top 12 (FIGS. 1 and 2), the four sides 14 (FIGS. 1 and 2) and the rim 18 (FIG. 2) of the mattress. To soften the thermo-plastic sheet, a suitable heater such as one including infra-red or Calrod heaters 31 is moved into position to heat the plastic sheet in a manner known in the art. During forming, the sheets of polyvinyl chloride are held by a clamping frame 34.

All four corners about the rim 18 (FIG. 2) are formed as corners of a parallelopiped. That is, they include three substantially perpendicular intersecting edge portions to form three right angle corners. Another way of describing the solid right angle is that when the water bed mattress 10 (FIG. 1) is inflated so that the sides 14A-14D (FIGS. 1 and 2) are at right angles with respect to each other, the surface 20 (FIG. 2), forming the bottom, is substantially perpendicular to all of the sides 14A-14D (FIG. 1) and a line bi-secting the angle of the top edges lies within the material. Essentially, the purpose of the formed corner is to prevent wrinkles at that corner in the rim.

Indeed, if there is a perpendicular bi-sector of the corner angles in the surface 20 (FIG. 2), lines within the member 20 near the bi-sector and perpendicular to that bi-sector will lie within the surface 20 to its edge. In other words, the surface 20 is stretched reasonably straight rather than angled upwardly as would be the case if the angle were not properly formed or were excessively obtuse so that there would be more material in the top surface than needed to stretch between the sides.

As shown in FIG. 4, the sheet of plastic 36 is pulled into the cavity 28, assisted by pressure from the plug assist 30 which is a rectangular plug sized to assert force against the sheet of plastic and pull it downwardly to aid in stretching the plastic within the cavities.

In FIG. 5, there is shown another embodiment of vacuum molding apparatus 26A having wall portions 27A forming a cavity 28A shaped as the top, sides and a rim around the bottom of a mattress 10 (FIG. 1) and a plug assist 30A which cooperate together with a vacuum outlet 32A to pull and force a PVC plastic sheet downwardly to form the top 12 (FIGS. 1 and 2), the four sides 14 (FIGS. 1 and 2) and the rim 18 (FIG. 2) of the mattress in a manner similar to that of the embodiments of FIGS. 3 and 4. Just as shown in the embodiments of FIGS. 3 and 4, the thermal plastic sheet is heated by any suitable heater such as one including infra-red or Calrod heaters 31A. During forming, the sheets of polyvinyl chloride are held by a clamping frame 34A.

As shown in FIG. 6, the sheet of plastic 36A is pulled into the cavity 28A, assisted by pressure from the air manifold 30A which is a rectangular manifold having air conduits to force air against the inner side of the walls 27A and the cavity 28A and thus aid in stretching the plastic within the cavity. With this forming approach, the plastic is stretched at the upper corners to form the rim 18 (FIG. 2) and to form square corners on what will become the side edges and the bottom edge.

The corners are formed in the embodiment of FIG. 5 by forming corners which are corners of a parallelopiped in the same manner as the embodiments of FIGS. 3 and 4. That is, they include three substantially perpendicular intersecting edge portions to form three right angle corners.

From the above description, it can be understood that the water bed of this invention and the method of making it have the advantages of: (1) providing a sturdy attractive top portion of a mattress; (2) enabling the bottom to be made of a heat-resistant material which is suitable for direct heating if necessary and yet does not wear out nor is especially expensive; and (3) permits easy alignment of the bottom section of heat resistant material with the top section for sealing purposes.

Although specific examples have been described with particularity, many modifications of the examples are possible in light of the above teachings. It is therefore to be understood that, within the scope of the appended claims, the invention may be practiced other than as specifically described.

I claim:

1. A method of making a water bed mattress comprising the steps of:
   vacuum forming a first sheet plastic material into five sides of a right regular parallelopiped;
   cutting said sheet with an edge around its rim;
   marking said rim for alignment purposes;
   providing a second plastic sheet having heat resistant qualities; and
   heat sealing said second plastic sheet to said rim using said alignment markers as guides, whereby a solid plastic right regular parallelopiped is formed with a heat resistant side.

2. A method in accordance with claim 1 in which the step of marking the rim includes the step of deforming the corners of the rim.

3. A method in accordance with claim 2 in which the step of vacuum forming further comprises forming a portion of a sixth side of said right regular parallelopiped adjacent to four of the other five sides from said first sheet plastic material.

4. A method in accordance with claim 3 in which the step of vacuum forming includes the step of vacuum forming said portion of said sixth side with a plane at the corners perpendicular to the corners of two of its adjacent sides at each corner to form a substantially right corner portion.

5. A method of making a water bed in accordance with claim 4 in which the step of heat sealing a second sheet includes the step of heat sealing a second sheet of plastic which is a heat resistant sheet of plastic of material differing from said first mentioned plastic sheet.

* * * * *